United States Patent [19]

Hall

[11] Patent Number: 5,605,557
[45] Date of Patent: Feb. 25, 1997

[54] CONDITIONING COMPOSITION AND CATALYST FOR USE THEREWITH

[75] Inventor: David A. Hall, Arundel, Australia

[73] Assignee: Plantagenet Holdings Pty Ltd., Arundel, Australia

[21] Appl. No.: 388,464

[22] Filed: Feb. 14, 1995

[30] Foreign Application Priority Data

Feb. 14, 1994 [AU] Australia .................. PM3870
Feb. 14, 1994 [AU] Australia .................. PM3871
Sep. 26, 1994 [AU] Australia .................. PM8410

[51] Int. Cl.$^6$ ........................................ C05G 3/00
[52] U.S. Cl. ................................. 71/62; 71/903
[58] Field of Search .................... 71/28, 62, 903

[56] References Cited

U.S. PATENT DOCUMENTS

| | | | |
|---|---|---|---|
| 3,785,798 | 1/1974 | Horai et al. ................... | 71/79 |
| 3,892,553 | 7/1975 | Goordman et al. ............. | 71/13 |
| 3,966,641 | 6/1976 | Csatar et al. ................. | 252/449 |
| 4,589,906 | 5/1986 | Brunn et al. .................. | 71/80 |
| 5,328,497 | 7/1994 | Hazlett ........................ | 71/28 |

FOREIGN PATENT DOCUMENTS

21561/88  3/1989  Australia .

*Primary Examiner*—Michael Lewis
*Assistant Examiner*—Amy M. Harding
*Attorney, Agent, or Firm*—Schwegman, Lundberg, Woessner & Kluth, P.A.

[57] ABSTRACT

A conditioning composition comprising from 60 to 80% by weight of a mineral source, from 20 to 40% by weight of basalt, from 2 to 5% by weight of a bonding agent, from 1 to 20% by weight of a mixed colloidal mineral source and an amount of catalyst provided in the ratio of at least one half liter of catalyst to at least 20 liters of water per 10 ton of composition. A catalyst for use with a conditioning composition, the catalyst comprising water, calcium nitrate, molasses, phosphoric acid and at least one non-ionic surfactant, each being provided in the following amounts (w/w):

| | |
|---|---|
| water | 30 to 60% |
| calcium nitrate | 2 to 40% |
| urea | 30 to 70% |
| molasses | 3 to 35% |
| phosphoric acid | 3 to 35% |
| non-ionic surfactant | 1 to 10%. |

30 Claims, No Drawings

CONDITIONING COMPOSITION AND CATALYST FOR USE THEREWITH

The present invention relates to a conditioning composition and a catalyst for use therewith, together with a method for manufacturing the composition. In particular, the invention relates to a composition which is suitable for use as a soil conditioner or fertilizer.

Through years of farming, erosion, overgrazing and leaching, many of the earth's soils are becoming depleted in minerals. Additionally, the constant assault on soils by agricultural and horticultural chemicals is lending to cause imbalances of the required nutrients in those soils. Thus, the soils, are often rendered unsuitable for further farming and are sometimes simply incapable of supporting normal levels of plant life.

An aim of the present invention is to provide an improved composition which is able to act as a soil conditioner or fertilizer and which provides an active source of minerals.

The present invention provides a conditioning composition comprising from 60% to 80% by weight of a mineral source, from 20% to 40% by weight of basalt, from 2% to 5% by weight of a bonding agent, from 1 to 20% by weight of a mixed colloidal mineral source and an amount of catalyst provided in the ratio of at least one half liter of catalyst to at least 20 liters of water per 10 ton of the composition. Preferably, the catalyst is provided in an amount such that the ratio is no more than 20 liters of catalyst to at least 20 liters of water per 10 ton of composition, and the catalyst preferably comprises water, calcium nitrate, urea (preferably prilled urea), phosphoric acid (preferably food grade phosphoric acid), molasses and at least one non-ionic surfactant.

The mineral source is preferably stone or rock of the granite-like family, such as glacial river gravel, feldspar, dirotite, granite and the like, and which is capable of acting as a source of minerals, trace minerals or ultra-trace minerals, provided that they are substantially free of heavy metal elements such as cadmium, mercury, lead, arsenic, uranium and the like.

Preferably, the mineral source of the composition of the invention is granite, and the composition preferably includes an amount of mixed colloidal granite to provide a level of mixed colloidal granite in the composition of from 1% to 10% by weight. However, it must be appreciated that reference to a mixed colloidal mineral source (and in the preferred form, a mixed colloidal granite) as a separate component to the mineral source (again, in the preferred form, a granite) is not to be taken as requiring the separate addition of components. Indeed, in the crushing and milling of a suitable amount of the mineral source there will always be generated an amount of colloidal residue and dust, and thus the requirements for a mineral source and a mixed colloidal mineral source may be met by the addition of an apparently single component.

Thus, in a preferred form of the invention, the composition contains about 70% by weight of a crushed and milled granite, about 25% by weight of a crushed and milled basalt, about 3% by weight grey cement as a bonding agent, about 2% by weight of a mixed colloidal granite and about one half liter of catalyst to about 20 liters of water per 10 ton of composition.

As indicated above, the mineral source is preferably a granite and is provided in a ratio of one-to-one as a combination of light granite and blue-green granite such as is quarried at Gosnells in Western Australia, Australia. The granite used is preferably low in silica, containing no more than 50% silica by weight, and preferably has an overall composition that includes the following (all percentages given by weight):

| | | | |
|---|---|---|---|
| $Al_2O_3$ | 12% | Co | 40 ppm |
| Ca | 4.75% | Cr | 79 ppm |
| Fe | 6% | Ni | 70 ppm |
| K | 3.5% | Zn | 100 ppm |
| Mg | 3.8% | Mn | 100 ppm |
| No | 2.5% | P | 2250 ppm |
| Si | 50% | Mo | 5 ppm |
| Cu | 300 ppm | S | 40 ppm |

In this respect, when mixed in the final product, the level of alumina ($Al_2O_3$) in the final product preferably does not exceed about 7.5%, while the levels of calcium and iron are preferably such that their levels in the final product are at about 6%. Further, the levels of potassium and magnesium preferably are such that their levels in the final product have a minimum of 2.5% and a maximum of 2.2% respectively, while the 2.5% sodium is a preferred maximum in the final product. The preferred levels of copper, cobalt, chromium, nickel, zinc, manganese, phosphorus, molybdenum and sulphur should be enough so as, when combined, the correct elements are provided in the appropriate preferred proportions in the final product. Those preferred proportions are provided below.

Preferably, the basalt includes the following components, and is provided as basalt such as is quarried near Bunbury, Western Australia, Australia or Werribee, Victoria, Australia (or the like), all percentages given by weight:

| | | | |
|---|---|---|---|
| $Fe_2O_3$ | 10% | Cr | 120 ppm |
| CaO | 9% | S | 100 ppm |
| $Al_2O_3$ | 5% | Ni | 80 ppm |
| MgO | 5% | Cu | 55 ppm |
| $Na_2O$ | 2.5% | Co | 40 ppm |
| P | 0.5% | Mn | 15 ppm |
| $K_2O$ | 0.45% | | |

The bonding agent is preferably provided as standard grey cement. The presence of the bonding agent assists in binding the silica particles to prevent their interaction with fluorine in soils. In this respect, fluorine occurs naturally in many soils and has also been injected into soils by the reasonably widespread use of superphosphate fertilizers. Due to the presence of the fluorine in soils treated by the improved composition of this invention, the microbial activity of the composition (in part introduced by the presence of the molasses and in part due to the pseudomonas microbes already in the soil) would be inhibited by the interaction of the unbonded silica with the fluorine. However, by bonding the silica the interaction of the silica with fluorine is made negligible and thus the microbial activity is not damaged.

Where the mineral source for the composition is granite, the mixed colloidal granite included in the composition is preferably provided from the same source as that granite as briefly indicated above. In this respect, fine granite dust produced during mining and extraction of the granite from a quarry is collected and is provided as the mixed colloidal granite in the final product. The colloidal granite assists in the production of humus in the soil. Humus is colloidal and to be complete as high quality plant food humus requires a broad spectrum of essential colloidal minerals. These are particles that are immediately available in the product and which are water soluble. These particles are preferably in a polarized state to assist in preventing them from being leached away.

Preferably, the composition of the invention provides a wide range of natural minerals which, as indicated above, may be obtained from a wide variety of stone or rock such as glacial gravel, feldspar, granite or the like, while meeting the various proportions as indicated below (all percentages given by weight). The figures in brackets are the preferred values:

| | | | | |
|---|---|---|---|---|
| Carbon | 0.1% | to | 1.0% | (0.24%) |
| Silicon dioxide | 10.0% | to | 50.0% | (29.6%) |
| Aluminum oxide | 1.0 | to | 16.0% | (7.5%) |
| Iron | 2.0 | to | 8.0% | (4.7%) |
| Magnesium | 1.5 | to | 2.5% | (2.5%) |
| Sulphur | 0.0 | to | 2.0% | (1.0%) |
| Potassium | 1.0 | to | 4.5% | (2.5%) |
| Sodium | 0 | to | 3.0% | (1.2%) |
| Phosphorus | 0.05% | to | 5.0% | (0.1%) |
| Calcium | 2.0% | to | 8.0% | (5.0%) |
| Copper | 30 ppm | to | 400 ppm | (327 ppm) |
| Manganese | 50 ppm | to | 500 ppm | (119 ppm) |
| Zinc | 40 ppm | to | 200 ppm | (78 ppm) |
| Chlorine | 0 ppm | to | 40 ppm | (40 ppm) |
| Nickel | 0 ppm | to | 30 ppm | (30 ppm) |
| Boron | 5 ppm | to | 100 ppm | (10 ppm) |
| Callium | 5 ppm | to | 20 ppm | (17 ppm) |
| Molydenum | 5 ppm | to | 50 ppm | (13 ppm) |
| Chromium | 5 ppm | to | 20 ppm | (8.6 ppm) |
| Cobalt | 5 ppm | to | 20 ppm | (7.8 ppm) |
| Iodine | 1 ppm | to | 10 ppm | (1.7 ppm) |
| Sellenium | 1 ppm | to | 5 ppm | (1.6 ppm) |
| Tin | 0 | to | 5 ppm | (1.0 ppm) |
| Antimony | 0 | to | 5 ppm | (0.8 ppm) |
| Tungsten | 1 ppm | to | 2 ppm | (0.43 ppm) |
| Silver | 0 | to | 1 ppm | (0.36 ppm) |
| Bismuth | 0 | to | 1 ppm | (0.1 ppm) |
| Germanium | 5 ppm | to | 200 ppm | (—) |
| Hydrogen | 0 | to | 100 ppm | (—) |
| Nitrogen | 0.005 ppm | to | 5.0% | (—) |

The catalyst preferably has the following composition (all percentages expressed by weight):

| | | | |
|---|---|---|---|
| water | 30% | to | 60% |
| calcium nitrate | 2% | to | 40% |
| urea | 30% | to | 70% |
| molasses | 3% | to | 35% |
| phosphoric acid | 3% | to | 35% |
| non-ionic surfactant | 1% | to | 10% |

Thus, the catalyst is preferably of a composition having about 50 liters of water, about 10 kg of calcium nitrate, about 30 kg of prilled urea, about 5 kg of molasses and about 10 kg of food grade phosphoric acid.

The urea in the catalyst is both cationic and anionic and creates a condition where, in use, there is an acceptable level of ionic release of the nutrients from the mineral sources (in the preferred form, in the granite and the basalt). Indeed, the urea allows for virtually immediate release of nutrients.

Further, the catalyst preferably also includes about 1 liter of a mixture of non-ionic surfactants, such as a surfactant marketed by Health Safe Solutions Pty Ltd (an Australian company) under the trade name G5 Surfactant. The surfactant used is non-ionic in order to ensure that the surfactant does not interfere with the ionic release referred to above that is caused by the presence of the urea. In this respect, it will thus be understood that any suitable surfactant may be used, provided that it is non-ionic.

Thus, the preferred composition of the catalyst (expressed on a percentage basis by weight) is:

| | |
|---|---|
| water | 31% |
| calcium nitrate | 12% |
| urea | 40% |
| molasses | 8% |
| phosphoric acid | 7% |
| non-ionic surfactant | 2% |

The presence of the calcium nitrate, the urea and the surfactant provides a synergistic effect on the minerals contained in the composition to allow the immediate (and subsequently slow) ionic release of those minerals into the composition and into the soil upon which it is used. Further, the molasses, which provides the microbial activity, acts as its own pH buffer to maintain the pH of the composition at a level suitable to protect the microbes in the molasses from harm due to the acidic effect of the phosphoric acid. Thus, the autotrophic action of the soil microbes is able to work on the minerals released to allow them to continue to release the appropriate nutrients into the surrounding soil.

In addition, the calcium in the calcium nitrate also assists in lifting the pH and maintaining the pH buffer. Indeed, the pH is preferably maintained above 5, but is ideally maintained between 6 and 7.

In this respect, enzymes are an essential ingredient to metabolization in all living things. Microbes are of course of the same family and are responsible for a wide variety of functions in soils including the production of humus, which is an important component of all fertile soils. It is the molasses in the composition of the present invention which carried the enzymes which help to trigger this activity.

Additionally, further additives may be included in the composition of the invention as necessary. In particular, it is envisaged that some uses of the composition of the invention would benefit by the addition of sufficient levels of phosphate to cater for phosphate maintenance where, for example, leaching in catchment areas is a problem. Ideally, this would be beneficial for broad acre agriculture where good phosphate levels are apparent and maintenance is required due to soil pH being lower (i.e. acidity is high). In this respect, use of the composition in areas where the potential for leaching presents problems is beneficial because the paramagnetic attraction within the composition prevents the release of phosphorus into waterways while the remaining nutrients remain readily available. Furthermore, the addition of phosphoric acid assists in reducing the bonding effect which holds the nutrients, thus assisting in the release of the nutrients at an acceptable speed.

Thus, phosphoric acid may be added to the composition at an appropriate stage, either as a replacement for added water, or in conjunction with added water where dilution of the phosphoric acid is required to control the levels of phosphate present. Preferably the phosphoric acid is technical grade phosphoric acid, although food grade phosphoric acid may also be used. Of course, the phosphoric acid should be substantially free of heavy metals.

Further still, where nitrogen and potassium may be required in the composition, such as for use in specialized agriculture such as potato farms, market gardens, or small crops in general that may be susceptible to leaching and pollution of the underground water and waterways, it is beneficial to also add potassium nitrate to the composition. Such potassium nitrate is preferably added in prilled form to assist in enabling the product to remain stable for long periods.

Further still, where the magnetic susceptibility of the granite and/or basalt used is comparatively low, even though the required elements are available and thus the granite and/or basalt supplies are otherwise suitable, an iron slag component may be beneficially added to the composition. Furthermore, an iron slag component is also beneficial where it is more economical to grade the fines with vibratory screens, rather than the rotary screens that will be mentioned below, as the iron slag will assist in holding the zeta potential due to the paramagnetic attraction, thus helping to polarize the finished product as it passes through the final stage of production.

Preferably, an amount of iron slag is provided in the range of 5% to 15% (by weight), although the preferred amount is about 10% (by weight). In this respect, the amount of iron slag required will generally alter in accordance with the requirements for extra magnetic potential. However, care will need to be taken in order to prevent causing an imbalance of the composition due to the addition of too much iron slag (i.e. too much iron and calcium).

As example of an exemplary analysis of an iron slag that would prove useful is as follows:

| Fe | 1 to 10% | $P_2O_5$ | 0.01 to 0.25% |
|---|---|---|---|
| $SIO_2$ | 30 to 40% | Cu | 6 to 10 ppm |
| CaO | 30 to 40% | Co | 1 to 10 ppm |
| MgO | 1.0 to 2.0% | Cr | 16 to 25 ppm |
| $Na_2O$ | 0.25 to 0.5% | Mu | 0.5 to 0.9% |
| $K_2O$ | 0.5 to 1.5% | Zn | 10 to 20 ppm |
| MnO | 0.5 to 1.0% | Pb | 5 to 10 ppm |
| $SO_3$ | 1.0 to 2.0% | Cd | 0 ppm |

Such a composition will beneficially provide a valuable level of calcium and available iron as solid nutrients for plants, while the other elements are not sufficiently high enough to create an imbalance in the composition.

In a further preferred form of the invention, the conditioning composition is process such that the range of particle sizes of the composition is in compliance with the following mesh requirements (within ±20%):

| Mesh | Passing |
|---|---|
| 2.36 | 95–100% |
| 1.18 | 85–95% |
| 0.600 | 65–75% |
| 0.300 | 45–55% |
| 0.150 | 30–45% |
| 0.075 | 20–30% |

These mesh requirements are designed to ensure that there are a number of release time intervals to allow nutrients to be made available progressively without overdosing the soil. Thus, the smaller particles release nutrients earlier whereas the larger particles continue to release nutrients after further time periods. Furthermore, the mesh requirements also ensure that the larger particles are large enough to hold their zeta potential to activate a paramagnetic blanket for the soil. This phenomenon encourages the root system of plants to spread more evenly instead of the tendency towards north and south, due to the effect of the poles. Indeed, if strong paramagnetic rock makes up at least 40% of the product, gravity or shaker screens may be used in place of the rotary screen (referred to below) without the paramagnetic quality being disturbed.

The method for producing the conditioning composition preferably comprises the steps of crushing a mineral source and basalt (the mineral source preferably being granite), classifying the crushed mixture of granite and basalt, preferably such that the crushed particles meet the mesh requirements referred to above, subsequently adding a bonding agent to the classified crushed particles, agglomerating the subsequent mixture with water either during or before the addition of the above catalyst, wherein the crushing, classifying and agglomeration occur in apparatus geared to turn in an anti-clockwise direction (when facing where the product enter the machine), preferably at revolutions per minute in the order of 15 to 30 revolutions.

In a preferred form, the crushing means is a ball mill geared to turn in an anti-clockwise direction at about 20 revolutions per minute. However, the crushing means may be any suitable apparatus such as a Barmac crusher or Simmons rotary cone type crusher. A relatively slow speed is required in order to assist in reducing the creation of large impacts which would produce heat which may spoil the zeta potential of the molecules and of the colloidal particles.

Preferably, crushed granite and basalt are classified in a rotary screen of a size such that all material is smaller than 2.36 micron. Again, the rotary screen is preferably geared to turn in an anti-clockwise direction (when facing where the product enter the machine) in order to assist in the polarization of the molecules. The speed of rotation of the rotary screen is preferably no more than 30 revolutions per minute and is more preferably about 20 revolutions per minute. In this respect, polarization is most important for plant life, and the nearer the north pole the faster the plants mature. Indeed, plants will naturally send their major root systems in the direction of the poles, with the strongest tendency to the north pole. In relation to the present invention, due to the composition being polarized, a paramagnetic blanket is formed ensuring the east-west polarity is just as effective allowing much larger plant growth, with faster maturity. The larger root growth ensures more organic matter under the soil, thus increasing soil fertility and providing more nutritious and disease resistant plants.

A mixing tank and feeding shute may be provided in order to allow the addition of ordinary burnt limestone grey cement to the crushed and classified mixture. Preferably, the grey cement is added such that the amount of grey cement is 3% by weight. As indicated above, the grey cememt is used to bond the silica to assist in the slow release of the nutrients and to prevent damage to the microbes of the molasses. In this respect, the inclusion of granite containing high levels of unbonded silica can produce toxic substances in the soil if the soil has previously been treated with superphosphate or if the soil has reasonably high levels of fluorine contaminants.

The agglomeration step is preferably used to mix and semigranulate the final product. Again, the agglomerator preferably also turns in an anti-clockwise direction (when facing where the product enters the machine) to ensure the correct zeta potential and to ensure that polarization of the product is maximized. This ensures that the cement mixes completely with the crushed and ground granite and basalt for total bonding or the particles and assists in the prevention of lumping in the finished product to prevent damage to agricultural machinery.

In the preferred form, a high pressure nozzle is utilized to apply water to the agglomerator in order to supply water in a fine spray at an angle to the axis of rotation of the agglomerator of about 30 degrees. Preferably, this water mixes with the agglomerator at a location about 1.5 meters from the entry of the product to the agglomerator. Furthermore, the water preferably strikes the mixing material on an upward motion, three-quarters of the distance of the upward arc. This assists in ensuring that the water mixes correctly and that semigranulation occurs. The water is preferably also polarized before being used in the mixing.

Finally, a tank and pressure pump may be utilized to apply the catalyst to the agglomerated product as it leaves the agglomerator. After having been stockpiled, the amount of product produced daily must be removed after the cement has cured, which is normally after about 12 hours. In this respect, it is preferred to maintain the moisture level of the final product above about 3% by weight to assist in protecting the microbe population of the catalyst. Further, this indicates that the amount of water used for the agglomeration step is somewhat dependent upon the moisture content of the raw materials. As the water content effects the bonding ability of the cement and also effects the flow of the material through the apparatus there is a need to monitor the moisture content thereof. In this respect, it has been found that volumes of water in the order of 25 liters per ton to 50 liters per ton may be required for use as makeup water in the agglomerator, depending upon the initial moisture levels.

With regard to the production of the catalyst itself, the preferred method for producing the catalyst comprises the steps of placing water in a container, adding the surfactant to the water and mixing thoroughly, adding the calcium nitrate and mixing until dissolved, adding the urea and mixing until dissolved, adding the molasses and mixing until dissolved, and finally adding the phosphoric acid until dissolved. All mixing is preferably conducted such that stirring occurs in an anti-clockwise direction, again to ensure that the appropriate polarization is acquired.

In this respect, polarization is most important for plant life, and the nearer the north pole the faster the plants mature. Indeed, plants will naturally send the majority of their roots in the direction of the north pole and to a lesser degree in the direction of the south pole. In relation to the present invention, due to the composition being polarized, a paramagnetic blanket is formed ensuring the east-west polarity is just as effective allowing much larger plant growth, with faster maturity. The larger root growth ensures more organic water under the soil, thus increasing soil fertility and providing more nutritious and disease resistant plants.

In the further embodiment described above where phosphoric acid and/or potassium nitrate are required to be added for specialised uses, the technical grade phosphoric acid is preferably added during the mixing in the agglomerator where water is added through the jet. The phosphoric acid may be substituted for the water or, alternatively, a dilution of the phosphoric acid and water may be added depending upon the required phosphate level in the finished product.

Preferably, an amount of 30 to 100 kgs/ton of acid would be added or more preferably an amount in the order of 40 to 50 kgs/ton.

Furthermore, the potassium nitrate may be added to the final product in a prilled, granulated form is an additional agglomerator, again turning in an anticlockwise direction. Preferably, this step is taken using final product that has matured to a point where the cement bonding of the silica is complete, which is often as long as five days. Thus, the addition of the potassium nitrate is preferably attended to after that time to minimize change to the bonding.

The amount of potassium nitrate added will be sufficient to satisfy the needs of the various types of agriculture that require the potassium and the nitrate, yet does not dilute the product enough to alter the beneficial structure. Preferably, an amount of potassium nitrate in the order of 40 to 100 kgs/ton of product would be added, with a preferred amount often being about 50 kg/ton. It has been found that levels less than about 40 kgs/ton are generally insufficient to accomplish the required nutrient value, while more than 100 kgs/ton is generally cost prohibitive and alters the product balance by simple displacement.

Finally, it will be appreciated that there may be other variations and modifications to the methods and compositions described above that are also within the scope of the present invention.

What is claimed is:

1. A soil conditioning composition comprising from 60 to 80% by weight of a mineral source, said mineral source being stone or rock of the granite-like family from 20 to 40% by weight of basalt, from 2 to 5% by weight of a bonding agent, from 1 to 20% by weight of a mixed colloidal mineral source and a catalyst to assist in releasing nutrients from the mineral source and the basalt to the soil, said catalyst applied in the ratio of at least one half liter of catalyst to at least 20 liters of water per 10 ton of composition.

2. A soil conditioning composition according to claim 1, wherein the mixed colloidal mineral source is an amount of a mixed colloidal granite to provide from 1% to 10% by weight thereof in the composition.

3. A soil conditioning composition according to claim 2 wherein fine granite dust produced during mining and/or extraction of granite from a quarry is collected and is provided as the mixed colloidal granite.

4. A soil conditioning composition according to claim 3 wherein the mixed colloidal granite is provided from the same source as the granite.

5. A soil conditioning composition according to claim 3 wherein the mixed colloidal granite is provided in the form of, water soluble particulate material which has a paramagnetic attraction to prevent leaching.

6. A soil conditioning composition according to claim 1, wherein the mineral source is selected from the group comprising granite, feldspar and glacial gravel.

7. A soil conditioning composition according to claim 3, wherein the mineral source is granite.

8. A soil conditioning composition according to claim 7 comprising about 70% by weight granite, about 25% by weight basalt, about 3% by weight bonding agent, about 2% by weight mixed colloidal granite and about one half liter of catalyst to 20 liters of water per 10 ton of composition.

9. A soil conditioning composition according to claim 8 wherein the granite is crushed and milled.

10. A soil conditioning composition according to claim 1 wherein the mineral source contains no more than 50% silica by weight.

11. A soil conditioning composition according to claim 1 wherein the mineral source is such that the composition contains levels of alumina, calcium, iron, potassium, magnesium and sodium such that their levels in the composition are as follows (percentage given by weight):

| | |
|---|---|
| alumina | no more than 7.5% |
| calcium | no more than 6.0% |
| iron | no more than 6.0% |
| potassium | no less than 2.5% |
| magnesium | no more than 2.2% |
| sodium | no more than 2.5%. |

12. A soil conditioning composition according to claim 1 wherein the basalt is crushed and milled.

13. A soil conditioning composition according to claim 1 wherein the bonding agent is standard grey cement and contains no additives.

14. A soil conditioning composition according to claim 1 wherein the catalyst comprises water, calcium nitrate, urea, phosphoric acid, molasses and at least one non-ionic surfactant, provided in the following amounts (expressed by weight):

|  |  |
|---|---|
| water | 30 to 60% |
| calcium nitrate | 2 to 40% |
| urea | 30 to 70% |
| molasses | 3 to 35% |
| phosphoric acid | 3 to 35% |
| non-ionic surfactant | 1 to 10%. |

15. A soil conditioning composition according to claim 14 wherein the catalyst comprises (expressed by weight):

|  |  |
|---|---|
| water | 31% |
| calcium nitrate | 12% |
| urea | 40% |
| molasses | 8% |
| phosphoric acid | 7% |
| non-ionic surfactant | 2%. |

16. A soil conditioning composition according to claim 15 wherein the non-ionic surfactant is a mixture of three surfactants.

17. A soil conditioning composition according to claim 1 wherein the composition additionally includes phosphoric acid either as a replacement for added water or in conjunction with added water.

18. A soil conditioning composition according to claim 17 wherein an amount of phosphoric acid is added such that the amount of phosphoric acid in the composition would be in the range of from 3 to 10% by weight.

19. A soil conditioning composition according to claim 1 wherein the composition additionally includes potassium nitrate in prilled form.

20. A soil conditioning composition according to claim 19 wherein an amount of potassium nitrate is added such that the amount of potassium nitrate in the composition would be in the range of from 4 to 10% by weight.

21. A soil conditioning composition according to claim 1, wherein the composition additionally includes an iron slag component.

22. A soil conditioning composition according to claim 21, wherein an amount of iron slag is added such that the amount of iron slag in the composition would be in the range of from 5 to 15% (by weight).

23. A soil conditioning composition according to claim 1, wherein the composition has a range of particle sizes in compliance with the following mesh requirements (within ±20%):

| Mesh | Passing |
|---|---|
| 2.36 | 95–100% |
| 1.18 | 85–95% |
| 0.600 | 65–75% |
| 0.300 | 45–55% |
| 0.150 | 30–45% |
| 0.075 | 20–30%. |

24. A soil conditioning composition comprising from 60 to 80% by weight of granite, from 20 to 40% by weight of basalt, from 2 to 5% by weight of a bonding agent, from 1 to 10% by weight of mixed colloidal granite and an amount of catalyst applied in the ratio of at least one half liter of catalyst to at least 20 liters of water per 10 ton of composition.

25. A method for producing a soil conditioning composition, the method comprising the steps of:

crushing a supply of basalt and a mineral source being stone or rock of the granite-like family;

classifying the crushed mixture of mineral source and basalt;

adding a bonding agent to the classified crushed particles adding a catalyst to assist in releasing nutrients from the mineral source and the basalt of the soil;

agglomerating the subsequent mixture with water either during or before the addition of the catalyst;

wherein the crushing, classifying and agglomeration occur in apparatus geared to turn in an anti-clockwise direction.

26. A method according to claim 25 wherein the mineral source is granite.

27. A method according to claim 25 wherein the crushed mixture of granite and basalt are classified according to the following mesh requirements:

| Mesh | Passing |
|---|---|
| 2.36 | 95–100% |
| 1.18 | 85–95% |
| 0.600 | 65–75% |
| 0.300 | 45–55% |
| 0.150 | 30–45% |
| 0.075 | 20–30%. |

28. A method according to claim 25 wherein the crushing, classifying and agglomeration occur in apparatus geared to turn in an anti clockwise direction at revolutions per minute of about 15 to 30 revolutions.

29. A method according to claim 25 wherein water is added to the agglomeration step in the form of a fine spray at an angle to the axis of rotation of the agglomerator of about 30 degrees.

30. A method according to claim 29 wherein the water strikes the mixing material on an upward motion to achieve maximum mixing.

\* \* \* \* \*

UNITED STATES PATENT AND TRADEMARK OFFICE
CERTIFICATE OF CORRECTION

PATENT NO. : 5,605,557
DATED      : February 25, 1997
INVENTOR(S) : David A. Hall It is certified that error appears in the above-identified patent and that said Letters Patent is hereby corrected as shown below:

In the Abstract, line 8, please insert "UREA" before "MOLASSES".

In Column 2, line 9, please delete "No" and insert --Na--.

In Column 4, line 32, please delete "carried" and insert --carries--.

In Column 5, line 40, please delete "process" and insert --processed--.

In Column 6, line 12, please delete "enter" and insert --enters--.

In Column 6, line 38, please delete "fortility" and insert --fertility--.

Signed and Sealed this

Seventeenth Day of March, 1998

Attest:

BRUCE LEHMAN

*Attesting Officer*  *Commissioner of Patents and Trademarks*